P. P. BOLAND.
COMBINED GROUND HARROW AND ROLLER.
APPLICATION FILED AUG. 28, 1912.
1,073,952.
Patented Sept. 23, 1913.
Fig. 1.
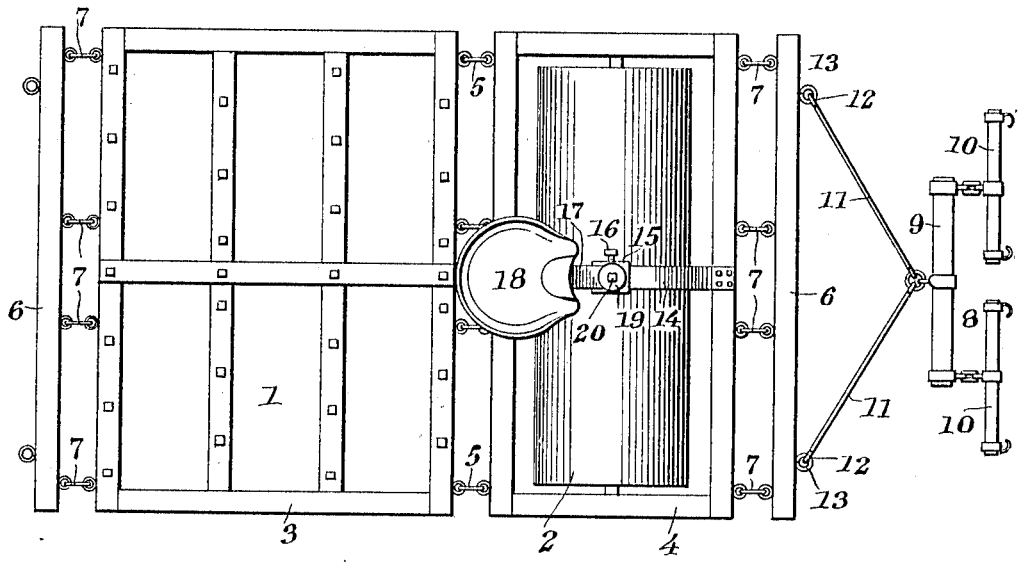
Fig. 2.
Fig. 3.
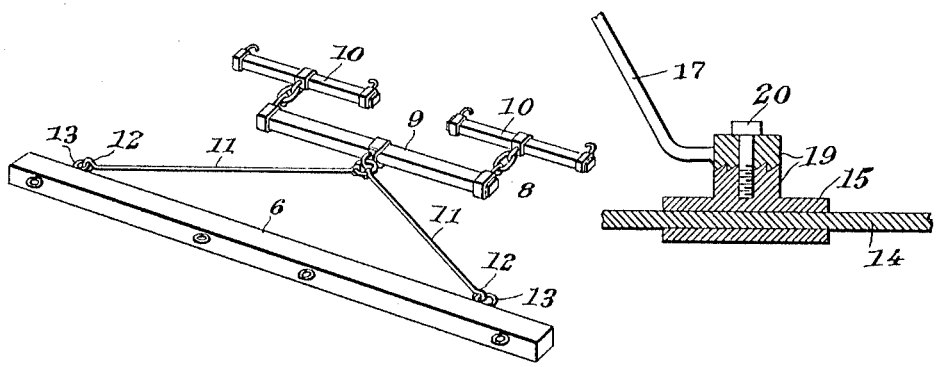
Inventor
P. P. Boland
Witnesses
M. F. Gannett
C. C. Hines
By Victor J. Evans
Attorney

UNITED STATES PATENT OFFICE.

PHILIP PIERRE BOLAND, OF EUREKA, MISSOURI.

COMBINED GROUND HARROW AND ROLLER.

1,073,952.  Specification of Letters Patent.  Patented Sept. 23, 1913.

Application filed August 28, 1912. Serial No. 717,576.

*To all whom it may concern:*

Be it known that I, PHILIP P. BOLAND, a citizen of the United States, residing at Eureka, in the county of St. Louis and State of Missouri, have invented new and useful Improvements in Combined Ground Harrows and Rollers, of which the following is a specification.

This invention relates to a combined ground harrow and roller, the object of the invention being to provide an implement of this character in which provision is made for attaching the draft appliances at either end of the implement, whereby the implement may be drawn across the ground with either the harrow or the roller in advance of the other, according to the character of the work to be done, and wherein a driver's seat is employed which may be reversed as to position according to the arrangement of the proper attachment.

The invention consists of the features of construction, combination and arrangement of parts hereinafter fully described and claimed, reference being had to the accompanying drawings, in which:—

Figure 1 is a top plan view of a combined harrow and roller embodying my invention. Fig. 2 is a detail view of one of the draft bars and the draft rig removed. Fig. 3 is a sectional view illustrating the construction of the adjustable seat.

Referring to the drawing, 1 designates a ground harrow of any ordinary construction, and 2 a ground roller, the frames 3 and 4 of the harrow and roller being coupled by suitable pivotal connections 5, so that the two may be drawn together across a field with either one in advance of the other. The outer side of the respective frames 3 and 4 are provided with similar draft bars 6, coupled thereto by fastening elements 7, which bars are adapted to interchangeably receive a draft rig or appliance 8. This draft rig or appliance is shown in the present instance as comprising a doubletree 9 carrying two or more swingletrees 10, said doubletree being pivotally attached to a pair of rearwardly diverging draft rods 11 having hooked ends 12 to engage eyes 13 or the like on the ends of either draft bar 6, by which the draft rig may be coupled to either the harrow side or roller side of the implement, so that the implement may be drawn across the field with either the harrow or the roller moving in an advanced position, according to the character of work to be done.

The frame 4 of the roller supports a seat bar 14 carrying a sliding sleeve 15 adapted to be secured in position by a set screw or other similar fastening 16, whereby said sleeve may be adjusted in a direction longitudinally of the implement. Pivotally connected with the sleeve is a seat standard 17 carrying a driver's seat 18, such pivotal connection comprising a pair of toothed coupling heads 19 on the sleeve and seat standard, together with a coupling bolt 20 whereby the heads may be clamped and locked to hold the seat firmly in adjusted position. The described construction allows the seat to be adjusted forwardly or rearwardly and to be turned to face either end of the implement, so that the driver may have direct control over the draft animals whether the implement is moving with its harrow portion or roller portion foremost.

From the foregoing description the construction and mode of use of my improved combination harrow and roller will be readily understood, and it will be seen that the invention provides an implement of this character which affords manifold conveniences, and by means of which the ground may be first harrowed and then rolled, or first rolled and then harrowed, as circumstances may require, by the use of one and the same implement.

I claim:—

A combination implement of the character described comprising a harrow frame provided with rigid depending harrow teeth operative in either direction of movement of said frame, said frame being provided at front and rear with spaced eyes, a second frame having a ground roller journaled therein and provided at front and rear with similarly arranged eyes, links connecting the eyes at the inner sides of the frames, draft bars at the outer sides of the frames having correspondingly arranged eyes at their inner sides and each provided with a pair of spaced eyes at its outer side, links connecting the eyes of the draft bars with the eyes at the outer sides of the respective frames, a draft attachment including rods having hooks adapted for interchangeable connection with the eyes at the outer side of either of said draft bars and a seat reversibly mounted upon the roller carrying frame for adjustment to face toward either of said draft bars.

In testimony whereof I affix my signature in presence of two witnesses.

PHILIP PIERRE BOLAND.

Witnesses:
J. D. BOLAND,
Z. V. BOLAND.

Copies of this patent may be obtained for five cents each, by addressing the "Commissioner of Patents, Washington, D. C."